United States Patent
Kasi et al.

(10) Patent No.: US 6,256,641 B1
(45) Date of Patent: Jul. 3, 2001

(54) CLIENT TRANSPARENCY SYSTEM AND METHOD THEREFOR

(75) Inventors: Jayaram R. Kasi, San Jose; Jari Koistinen, Palo Alto; Ellis Y. Chi, Sunnyvale; Svend Frolund, Mountain View, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/212,739

(22) Filed: Dec. 15, 1998

(51) Int. Cl.[7] ........................................... G06F 9/00
(52) U.S. Cl. ........................ 707/202; 707/201; 707/2
(58) Field of Search ........................................ 707/1–206

(56) References Cited

U.S. PATENT DOCUMENTS 6,076,108 * 6/2000 Courts et al. ....................... 709/227
6,085,220 * 6/2000 Courts et al. ....................... 709/201

\* cited by examiner

Primary Examiner—Thomas Black
Assistant Examiner—John G. Mills, III (57) ABSTRACT

A three-tier system is built up as: one or more client applications, one or more server applications, and one or more database systems. The server application provides a service that can be shared among multiple client applications. Server applications store their data in a database system. A client transparency mechanism and a server transparency mechanism are added. A database system on a clustered node is used for the database management. Server applications implement transactional behavior and the server side of the protocol so that the client applications may recover from server application and database system failures. The cluster application programming interface is used to determine whether, when, and if to retry. Information is stored in the database system so that the outcome of the transaction can be determined.

20 Claims, 4 Drawing Sheets

CLIENT TRANSPARENCY SYSTEM AND METHOD THEREFOR

TECHNICAL FIELD

The present invention relates generally to transaction processing systems (TPS) and more particularly to problem correction systems which minimize user intervention.

BACKGROUND ART

Commonly, human end-users are exposed to many different failures and error situations in systems which are called transaction processing systems (TPS). TPSs are three-tier (client-server-database) systems which allow client applications to perform database transactions. For example, there are various reservation systems, such as for airlines, hotels, and car rentals, and financial systems, such as banking, credit card, and automated teller machines. In these systems, a customer or sales representative uses a client application that allows a user to query and update a database. The client interface allows the client to specify which database to add information to or to update. If a failure occurs, for example during an update, it is difficult for the client to know whether the update was actually performed or not.

As an example, for an Automated Teller Machine (ATM) failure, it is likely that the ATM customer would need to call the bank to find out whether the transaction was completed properly. This would generate more work for bank employees and create unsatisfied customers and very costly in terms of the lost business, reduced productivity, and unsatisfied customers.

Essentially, the client needs to query the database and see if the update has been performed and if it has not, to reissue the update. Even this solution is, however, not failure proof.

First, the system might not know what the values were before the update, and if the update is relative to the old value, the client might not be able to determine whether the update was performed or not. For example, if the ATM transaction involved a deposit to an account, the bank employee would have to have information regarding the previous balance and any other deposits and withdrawals that may have occurred to the account around the time of the failure.

Second, another client might have done an update after the first client's query and failed update. Therefore, the first client will not be able to determine with confidence whether the update was performed or not. Thus, the first client would have to guess what to do.

Thus, involving the client in the recovery of a failed request should be avoided to the largest possible extent. Unfortunately, complex commercial database systems and transaction processing systems generally fail to provide client transparency, or the ability to detect and correct problems without human intervention. Rather, it is expected that the failure recovery either be handled by the client or be coded into applications.

Embedding the failure recovery into the application code complicates the application considerably and is error prone.

Implementing error recovery logic is difficult and complex. Client applications as well as application servers currently need to implement error recovery as part of the application specific code. Further, the error recovery logic is not necessarily reusable for any application adhering to the described architecture.

In a TPS the client application code demarcates the transaction. If the transaction fails, the client application retries the transaction. This might or might not involve action from the end user. In the worst case the end client might need to reissue the transaction. There is a key problem with this approach in that there is a window in which a failure can occur when the client application does not know the outcome of the transaction. In the worst case the client needs to manually check if the transaction was committed and then take the appropriate action.

Replication protocols, such as ISIS and Horus, both from Cornell University, allow a service to be implemented by multiple servers, called a server group. Each request issued by a client application will be sent to all the servers. The protocol ensures that the requests processed by the servers of a group are processed synchronously according to some synchronization criteria. The states of servers are kept consistent by ensuring this synchronization. When new servers join a group the state is transferred from a server that is up to date.

The main idea of replication protocols is that if the states are kept consistent for two or more servers, one of them can fail without impacting the delivery of the service.

It is hard, and often impossible, to use replication solutions to solve reliability of services using database applications. The reason is that multiple servers can not simultaneously coordinate their writes to the same database. If different databases were used it would be difficult to keep the databases consistent. Both these problems are complicated further by the fact that databases can be accessed by other applications, causing the databases to diverge.

Thus, it is very difficult and often impossible to use replication protocols for the type of database (or state aware) applications for which the error recovery problem needs to be solved.

Even if it were simple to use replicated systems for database applications, they do not provide any support for automatically recovering from a failure during a database transaction. A client application would still need to determine the outcome of the transaction.

Basically, although replication protocols can provide error recovery to certain types of systems, they are not suitable for database applications. Secondly, it would still be necessary to determine the outcome of failed calls in some manner.

Traditional, high availability solutions for database-centric applications are typically based on clusters. A cluster consists of multiple computers, called nodes. Each node is capable of running a database, and when the database fails, it is restarted by cluster manager software. The consistency model for the database is based on the notion of "rollback" where the database is restarted in some previous, consistent state. The transactions that were being executed when the database failed are aborted.

Traditional cluster mechanisms limit database down time because they immediately restart the database. However, the failure is visible to the database clients. The clients may experience lost connections to the database, aborted transactions, and indeterminate transactions where the outcome cannot be determined.

The Microsoft Transaction Service (MTS) provides a programming model and runtime system for three-tiered, component-based systems. MTS provides transactional semantics for the components in the middle tier. These components are annotated communications (COM) components where the annotations capture transaction composition across components. From an application architecture perspective, MTS supports a programming model in which the middle tier contains stateless objects and transactions are demarcated in the middle tier.

However, MTS does not provide error-recovery logic. Client applications using MTS-controlled objects must manually and explicitly implement error recovery logic to determine the outcome of database transactions. Moreover, client applications will have to explicitly handle failures of middle-tier objects: they must catch exceptions that occur when middle tier objects fail and they must subsequently connect to a new middle tier object.

An answer has long been sought to solve the above problems, but they have also long eluded those skilled in the art.

DISCLOSURE OF THE INVENTION

The present invention is targeted to three-tier transaction processing systems (TPSs) built up as: one or more client applications (CAs), one or more server applications (SAs), and one or more database systems (DBS). The client application implements an application that requires data and services that are best realized as distributed resources. A SA represents such a resource. The SA provides a service that can be shared among multiple CAs. SAs store their data in a database. A client transparency mechanism (CTM) and a server transparency mechanism (STM) are added, and both can be represented as conventional state machines. A database on a clustered node is used for the database management. SAs implement transactional behavior. The STM implements the server side of the protocol so that the CAs may recover from SA and database failures. The cluster application programming interface (API) is used to determine whether, when, and if to retry. Information is stored in the database so that the outcome of the transaction can be determined.

The present invention provides a simpler programming model for CAs and SAs where the error recovery logic is embedded in middleware.

The present invention further provides very high-availability from a client's perspective since most failures can be automatically recovered.

The present invention further provides a TPS in which CAs do not need to do outcome determination after a failure and a subsequent system recovery.

The present invention further provides a TPS in which SAs do not need to explicitly reconnect to database or request retry from the CA.

The present invention further provides a TPS in which the solution masks communication and node failures for the CA.

The present invention further provides a high-availability TPS which uses a data store with a notion of transaction.

The present invention further provides a TPS in which the CA uses stateless servers that uses data-stores to save information and system state.

The present invention further provides a TPS in which an operation request will correspond to one transaction.

The present invention further provides a TPS in which all SAs use the same data store.

The present invention further provides a TPS in which data-stores are made highly available using a fault-tolerance solution, such as a cluster.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
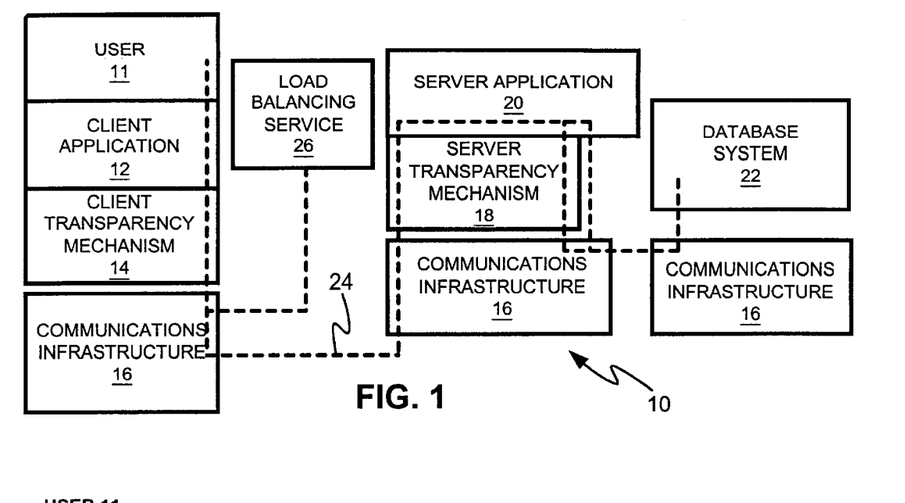
FIG. 1 is a three-tier TPS incorporating the client transparency system of the present invention.

Referring now to FIG. 1, therein is shown a transaction processing system (TPS) 10. A user 11 of the TPS 10 would interact with a client application (CA) 12, which could be one personal computer in a large network. The CA 12 has an attached client transparency mechanism (CTM) 14. The CTM 14 is connected to a conventional communications infrastructure (CI) 16.

The CI 16 represents communications systems such as telephone lines, dedicated lines, etc. which allow both local and remote communications between systems connected to it.

A plurality of server transparency mechanisms (STMs) 18 (18-1, 18-2, etc., not shown) are connected to the CI 16 and a plurality of server applications (SAs) 20 (20-1, 20-2, etc., not shown) are each connected to their respective STMs 18. Generally, there will be a plurality of SAs 20 which implement transactional behavior. The plurality of STM's 18 implement the server side of the protocol which will herein be described, so that CAs may recover from application and database failures. The SAs 20 are further connected directly to the CI 16.

A database system (DBS) 22 is further connected to the CI 16. The DBS 22 stores data persistently and is one which can be restarted fast with data consistency guarantees to enable fast recovery from faults. The systems that exhibit traditional behavior may be implemented as databases on a clustered node. Further, the DBS 22 is capable of storing information so that the outcome of transactions can be determined.

A load balancing service (LBS) 26 is connected to the CI 16. The LBS 26 registers the SAs and balances the load between the SAs having the same functionality so as to avoid overloading any particular SAs. In an alternative embodiment, the LBS 26 could balance load by other methods, such as a simple round-robin allocation method.

A bi-directional communication path 24 interconnects all the entities involved in the TPS 10.

Figure 2:
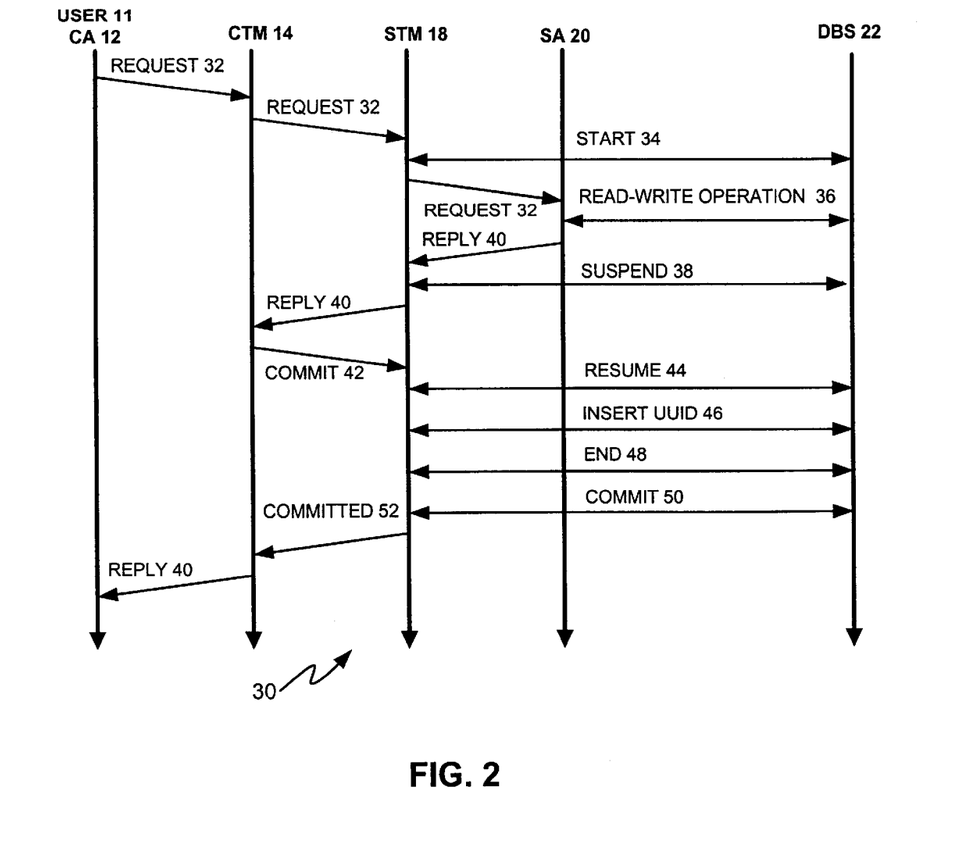
FIG. 2 is a timeline diagram for a problem-free TPS incorporating the present invention.

Referring now to FIG. 2, therein is shown the basic structure of the method of the present invention which is depicted as a timeline diagram 30. The timeline diagram 30 shows the order in which components of the TPS 10 exchange messages across the CI 16. The vertical lines represent the system components, which are the CA 12, the CTM 14, the STM 18, the SA 20, and the DBS 22. The user 11 is shown with the CA 12. Horizontal lines represent messages. A line with one arrow represents a single message with the arrow indicating the direction of the message from the sender to the receiver. A line with two arrows represents bidirectional messaging. The lines with two arrows allow for abstraction of the exchange of multiple messages as one logical exchange.

In FIG. 2 the messages are shown as part of a single end-to-end activity when no failures occur during the activity. The messages are more fully described as XA commands from a library of subroutines whose interfaces are defined by the X/Open Consortium and whose implementation is supported by many database vendors. The X/Open Consortium is an independent, worldwide, open systems organization supported by most of the world's largest information system suppliers, user organizations, and software companies. The consortium combines emerging standards into a comprehensive, integrated, high-value, and useable system environment called the Common Applications Environment (CAE). This environment covers the standards, above the hardware level, that are needed to support open systems. The CAE environment are defined and contain among other things, an evolving portfolio of practical application programming interfaces (APIs), which significantly enhance the portability of application programs at the source code level, and definitions of and references to, protocols and protocol profiles, which significantly enhance the interoperability of applications.

The user 11 first inputs a transaction into the CA 12. The CA 12 then sends a transactional request 32, which contains the information for the transaction, to the CTM 14. The CTM 14 resends it to the STM 18. The STM 18 then sends and receives start 34 messages to and from the DBS 22 to start a transaction. After the start 34, the STM 18 sends the request 32 to the SA 20. In response to the request 32, the SA 20 implements a read/write operation 36 with the DBS 22 and manipulates the DBS 22 in an application-specific manner. For example, the application-specific manner could be a banking transaction such as a deposit, withdrawal, transfer between accounts, etc.

When the manipulation is complete, the SA 20 sends a transactional reply 40 to the STM 18 which suspends the transaction of the DBS 22. After the suspend 38, the STM 18 sends the reply 40 to the CTM 14 as the response to the request 32. The CTM 14 then provides a commit 42 message to the STM 18 to initiate the commit phase of the transaction.

The commit phase includes a sequence of messages between the STM 18 and the DBS 22. Initially, a resume 44 releases the suspension of the transaction of the DBS 22. The STM 18 then inserts a unique transaction identifier, the universal unique identification (UUID), into a special table in the DBS 22 and sends an end 48 back to the STM 18. If the transaction has been committed successfully, the STM 18 sends a committed 52 message to the CTM 14. The CTM 14 then sends the transactional reply 40, which is the response information for the transaction, back to the CA 12 and thence to the user 11.

The UUID insertion is necessary to handle failures, or undesirable conditions, that happen during the server-side commit operations. If the CA 12 observes such failures, it does not know, per se, if the transaction was committed before the failure happened. If the transaction was not committed, the CA 12 must retry the commit operation. The STM 18 generates the UUID and inserts it into the DBS 22 as part of the server-side transaction. The CTM 14 can then use this UUID as a handle to the transaction and determine if the transaction has been committed. Since the UUID insertion is part of the transaction, the UUID will be in the database if and only if the transaction has been successfully committed. The DBS 22 and the STM 18 have the message end 48 and the commit 50 transmitted before the STM 18 provides the committed 52 to the CTM 14.

As can be seen from the above, the method has a two-phase nature. One logical method invocation involves two actual applications of the STM 18 and DBS 22 messages. The first invocation executes the transaction and the second invocation commits it as a completed transaction in the DBS 22. The two-phase nature ensures that a server-side transaction is not committed until the CTM 14 has received the reply of the method execution. If the CTM 14 does not receive the reply 40, it needs to retry the method invocation. The CTM 14 should not perform the retry if the transaction has already committed at the server side since that would cause the transaction to be executed twice.

The method also permits suspending the transaction at one server and resuming it at another in the event the first server fails after the suspend 38 but before the transaction is resumed.

Figure 3:
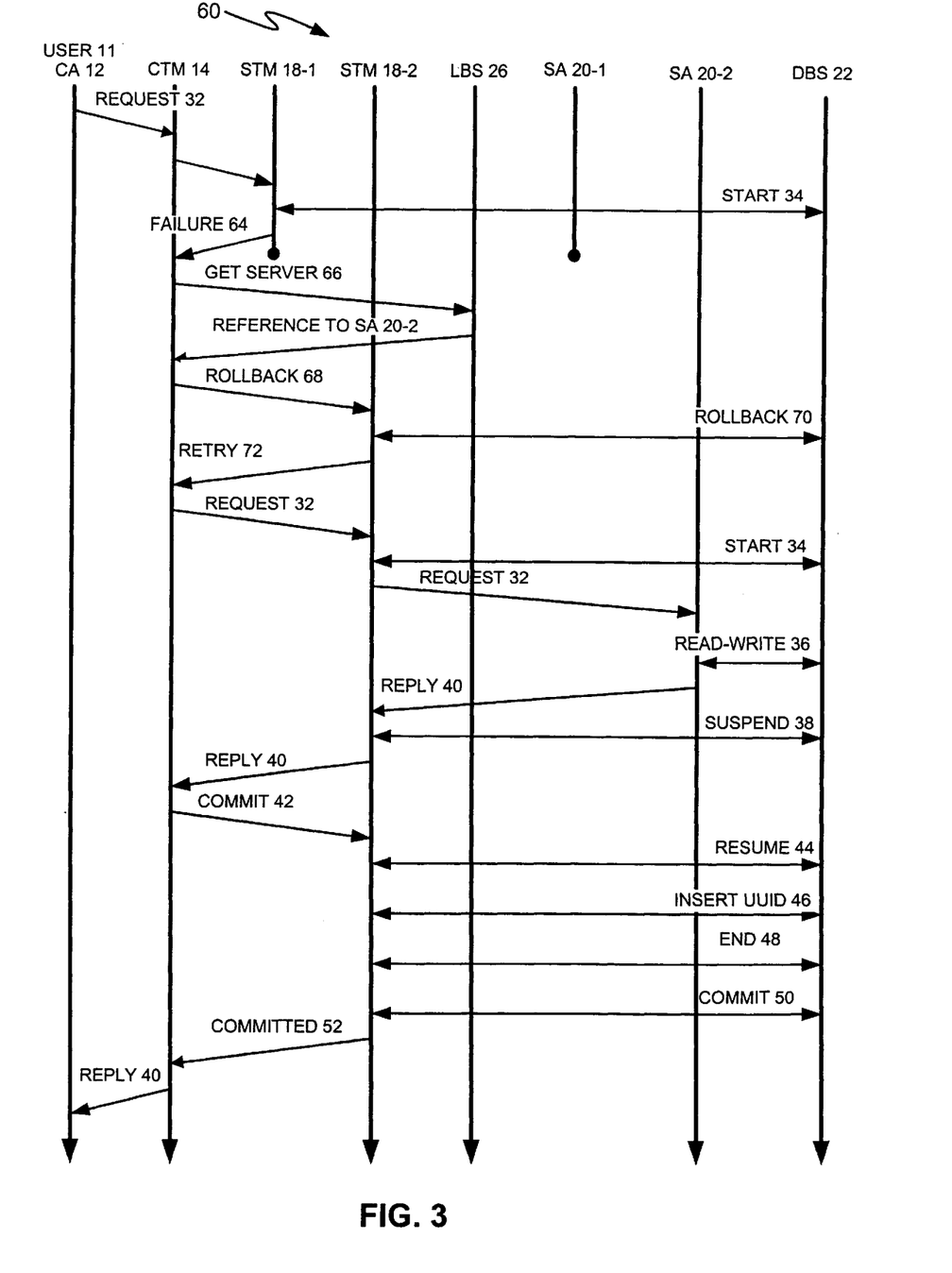
FIG. 3 is a timeline diagram for a TPS incorporating the present invention having an early server application problem.

Referring now to FIG. 3, therein is shown the operation of the method of the present invention when there is a failure, or undesirable operational condition, during the request 32. The method of operation is depicted as a timeline diagram 60. It should be noted that the present invention is described by its functionality in handling a couple of representative failure scenarios. It would be obvious to those having ordinary skill in the art how the system and method operate without undue experimentation.

Thus, FIG. 3 illustrates the method of operation when a SA 20-1 fails halfway through a transaction during the request 22. As well known to those skilled in the art, server applications have various means of indicating when they have failed.

The user 11/CA 12/CTM 14 send the request 32 through the STM 18-1 to SA 20-1 and the STM 18-1 sends start 34 to the DBS 22. If a failure occurs at the SA 20-1 before the transaction has completed, the CTM 14 recognizes a failure 64 which causes the CTM 14 to retry the method invocation. The failure 64 causes the server process to terminate, and the CTM 14 cannot retry the method invocation against the same server application SA 20-1. The CTM 14 needs to retry against a different server.

Multiple SAs provide the same functionality and CTMs can switch between SAs that provide the same functionality. To switch SAs, the CTM 14 uses the LBS 26 which stores references to the SAs and STMs and keeps track of which SAs provide the same functionality, such as SA 20-2, SA 20-3, etc. When the SAs start up, they register with the LBS 26 under a logical name that captures their functionality. For example, SAs could register under the names of the interface that they support. CA 12 and CTM 14 then use this logical name to access SAs through the LBS 26.

The primary purpose of the LBS 26, with respect to the functionality of the method of the present invention, is to map these logical names to SAs and thereby manage the redundancy in the middle tier. However, its primary purpose in the TPS 10 is to balance the load among all the SAs that implement the same interface during normal operation.

After the user 11/CA 12/CTM 14 send out the initial request 32 to the STM 18-1, the STM 18-1 and DBS 22 begin communication with start 34.

With a failure in SA 20-1 sometime after the start 34, CTM 14 determines that the failure 64 has occurred in the STM 18-1. The CTM 14 then sends a get server 66 message to the LBS 26 which selects a server application which is available and has the same functionality, such as SA 20-2. The CTM 14, without the intervention of the user 11, then sends a message, roll back 68, to the STM 18-2. The STM 18-2 sends a roll back 70 to the DBS 22 in order to free up resources, such as database locks, held by the failed transaction. When the roll back is complete, the DBS 22 is rolled back to the last committed transaction, and the STM 18-2 returns a message, retry 72, back to the CTM 14.

With the receipt of the retry 72, the CTM 14 proceeds with a retry of the request 32 and, without failures, will proceed with the same transaction, which is the same as shown in FIG. 2 and which utilizes the same messages with the same numbers as shown therein.

It should be noted that the user 11 and the CA 12 are not involved in the recovery from the failure of the SA so the failure recovery is transparent to them.

Figure 4:
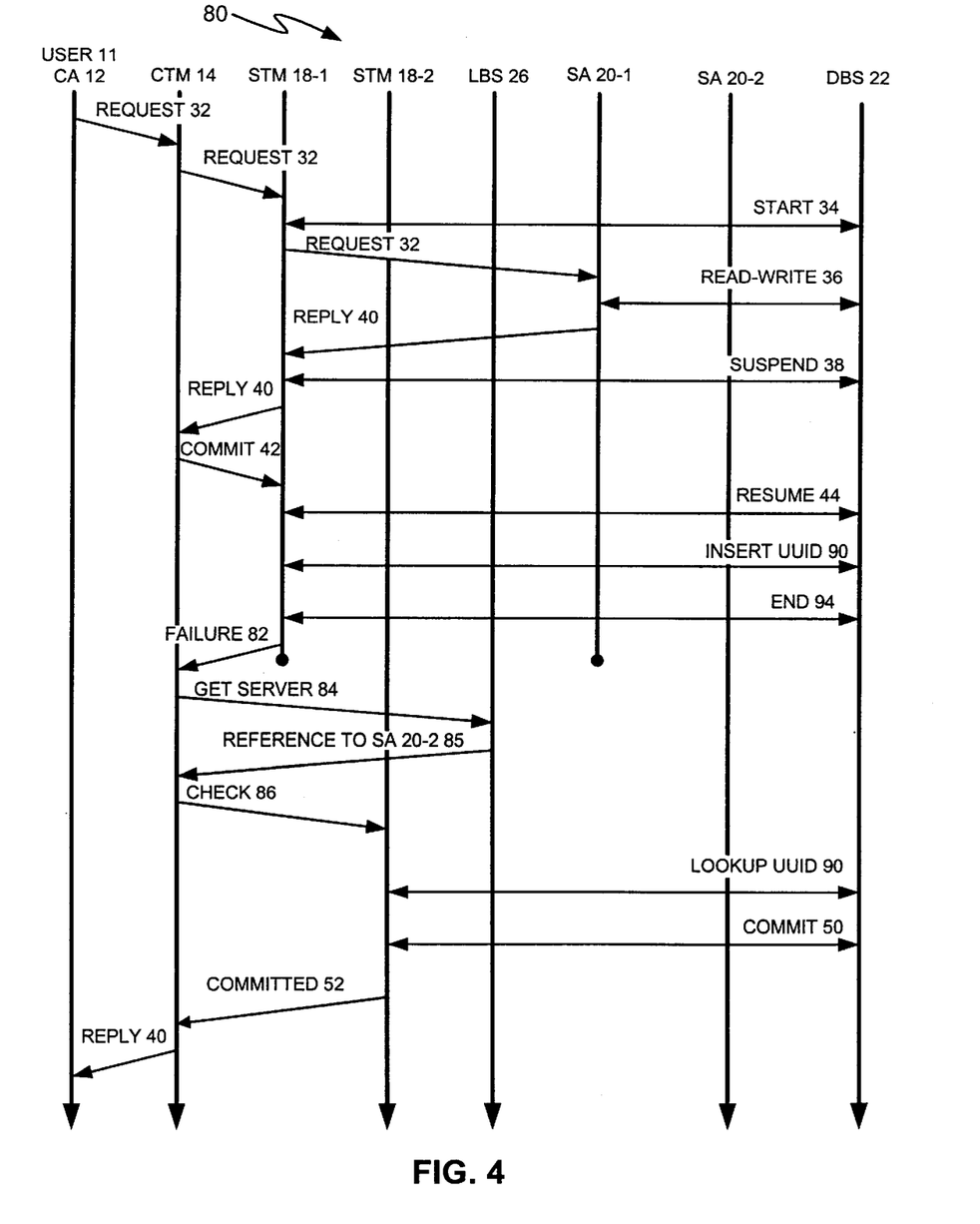
FIG. 4 is a timeline diagram for a TPS incorporating the present invention having an indeterminate time server application problem.

Referring now to FIG. 4, therein is shown the method of the present invention when there is a failure during the commit phase when it is not possible to determine when a server failed. The timeline diagram 80 shows the user 11/CA 12/CTM 14 providing the request 32 to the STM 18-1. After the start 34 from the STM 18-1 to the DBS 22, the STM 18-1 causes the SA 20-1 to execute the request 32 with read/write 36. After the SA 20-1 is complete, it sends the reply 40 to the STM 18-1. The STM 18-1 then suspends the transaction with DBS 22 with suspend 38. The reply 40 is then sent from the STM 18-1 on to the CTM 14. Upon receipt of the reply 40, the CTM 14 sends the commit 42 to the STM 18-1. The resume 44, insert UUID 90, and the end 94 are communicated between the STM 18-1 and the DBS 22, but the SA 20-1 fails before committing the transaction.

The CTM 14 recognizes the failure 82, and can not determine if the transaction was actually committed in the DBS 22 because the CTM 14 cannot tell exactly when the SA 20-1 failed.

To determine the outcome of the transaction, the CTM 14 first obtains a new server, SA 20-2, from the LBS 26 using the get server 84 and obtaining the reference to SA 20-2 85. The CTM 14 then sends a message, check 86, to the STM 18-2 for it to determine the state of the transaction due to the failure. The check 86 will have the UUID of the in-progress transaction when the failure occurred. The STM 18-2 then sends lookup UUID 90 and inspects the table of transaction identifiers in the DBS 22 to determine if the transaction was committed. For example, where the transaction did not commit, the STM 18-2 inserts the transaction identifier into the DBS 22. Assuming that the failure occurred after the end 94, the STM 18-2 will not find the UUID and will determine that the transaction has not yet been committed. The STM 18-2 and the DBS 22 will communicate the commit 50 which will cause the STM 18-2 to send the committed 52 message to the CTM 14. The CTM 14 will then send the reply 40 to the CA 12 and the user 11.

Again, it should be noted that the above failure is transparent to the user 11 and the CA 12.

Figure 5:
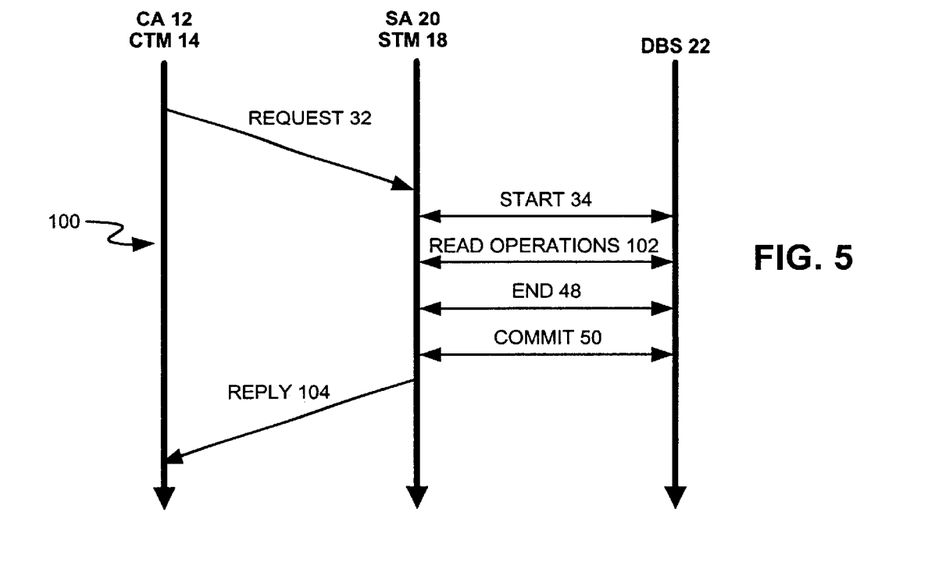
FIG. 5 is a timeline for a TPS incorporating the present invention performing read-only operations.

Referring now to FIG. 5, therein is shown a simplified version of the method of the present invention. The timeline diagram 100 depicts a read-only transaction. The two-phase nature of the method previously described ensures that it is always possible to re-execute the method until it is completed without failure and a result has been received. The two-phase nature is necessary to avoid executing the same transaction twice. However, for read-only transactions, the same transaction can be executed multiple times without bringing the system into an inconsistent state. Thus, the two-phase nature is not required to ensure consistent retries. Essentially, the CA 12/CTM 14 provides the request 32 to the STM 18/SA 20 and the start 34, read operations 102, end 48, and commit 50 can occur before the reply 104 is sent back to the CTM 14/CA 12.

In the TPS 10 of the present invention, the CTM 14 and the STM 18 provide automatic error recovery without client application or human user participation. The CTM 14 and the STM 18 implement a protocol which is hidden from conventional SAs 20 and the CA 12.

As would be evident to those having ordinary skill in the art, the TPS 10 is capable of handling a plurality of failure modes. For example, failure of a SA 20-1 during the initial request, a failure of the SA 20-1 just before committing, and the failure of the SA 20-1 after committing. Similar failures would be that of the DBS 22 or of the LBS 26 during an update.

Figure 6:
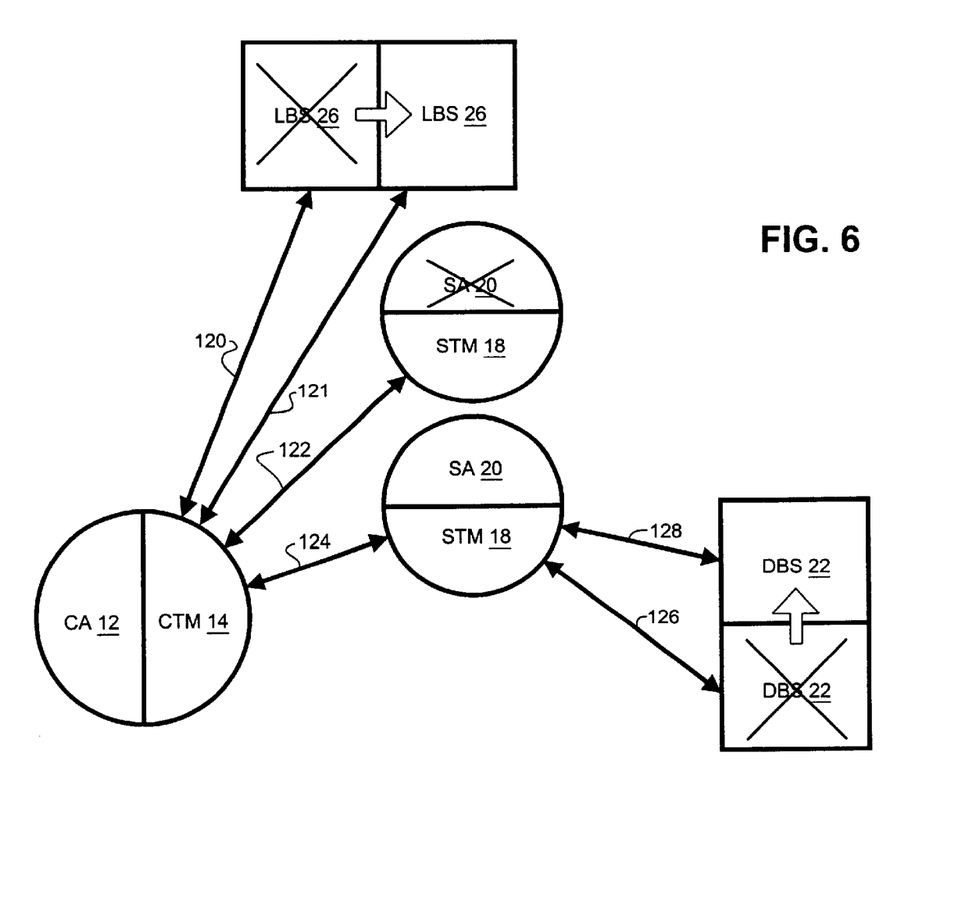
FIG. 6 is the high level architecture of the TPS incorporating the present invention showing possible failure modes and normal and alternate routings.

Referring now to FIG. 6, therein is shown a simplified schematic of the TPS 10 showing the possible failure modes and the normal and alternative routings. The CA 12/CTM 14 is connected by an arrow 120 to a failed LBS 26 and by an arrow 121 to a restarted LBS 26. It is also connected by an arrow 122 STM 18-1/SA 20-1 and by an arrow 124 to STM 18-2/SA 20-2. The STM 18-2/SA 20-2 is connected by arrow 126 to a failed DBS 22 and by an arrow 128 to a rolled back DBS 22.

As a system overview, the SAs, the STMs 18-1, 18-2, etc. register their respective SAs 20-1, 20-2, etc. with the LBS 26 at startup. When the CA 12 makes its first invocation of a SA, the CTM 14 will fetch a reference from the LBS 26 as indicated by the arrow 120. The CTM 14 then invokes the STM 18-1/SA 20-1.

If there is a failure of the SA 20-1 as shown by the "X", the SA 20-1/STM 18-1 informs the CTM 14 by the arrow 122. The CTM 14 will then fetch a reference from the LBS 26 to STM 18-2/SA 20-2. The CTM 14 then invokes the SA 20-2 through the STM 182. The STM 18-2 handles the database connections and performs transaction demarcation, while the SA 20-2 directly performs the actual manipulation of the database. The manipulation can be performed in a number of different languages such as Standard Query Language, SQL.

In the event of a failure of the DBS 22 as shown by the "X", the DBS 22 will provide an indication of its failure by one of a number of mechanisms, which are well known to those skilled in the art, back to the STM 18-2 as shown by the arrow 126. The DBS 22 will also restart itself, or rollback, to its last committed transaction. After the DBS 22 is restarted, the STM 18-2 will cause the communication to be established with the DBS 22 by the arrow 128.

After fetching the initial reference from the LBS 26, the CTM 14 uses this reference until it becomes invalid. In particular, the CTM 14 only communicates with the LBS initially and after failures, as indicated by the arrow 120. If there is a failure of the LBS 26 as shown by the "X", the references will be maintained in the LBS 26 and the CTM 14 will retry after the LBS 26 is restarted. There will be a failure over to the LBS 26, which then begins to supply references in the event of other component failures.

Again, it should be noted that the user 11 and the CA 12 are not involved in the recovery from the failure.

FIG. 6 is the high-level architecture and the arrows demonstrate common call paths. It is important to note that the CA 12 and the SA 20 need to know nothing about the LBS 26, the CTM 14, the STM 18, or the DBS API.

The client transparency protocol is implementable directly in and by the CA and SAs. However, it is more desirable from a customer point of view to be implemented so that it is transparent to the user and will require little change to the CA and SA. This would make the client transparency system transportable and implementable into existing systems.

In the TPS 10, the failure recovery logic is completely separated from the application logic, while there is a well-defined interface on the SA side. This means on the CA side, the application code is not aware of the failure recovery at any time. If the CA 12 is exposed to failure (which happens rarely), it can be assumed that the failure is serious and encompasses several entities of the TPS 10 such that human user intervention is actually required.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A method of controlling a transaction processing system having a first server application and a database system connectable to a communications infrastructure, comprising the steps of:
   receiving a request from the communications infrastructure by a first server transparency mechanism that a transaction be processed by the first server application;
   processing said transaction by the first server application and communicating said transaction to the database system;
   providing a reply to the communications infrastructure from said first server transparency mechanism after communicating said transaction to the database system;
   suspending operation of the database system after providing said reply;
   receiving a commit for said transaction from the communications infrastructure by said first server transparency mechanism;
   resuming the operation of the database system from said first server transparency mechanism;
   inserting a unique identification in the database system from said first server transparency mechanism after resuming the operation of the database system;
   providing an end for the transaction between said database system and said first server transparency mechanism;
   providing a commit response from the database system to said first server transparency mechanism after committing said transaction;
   providing an indication to the communications infrastructure from said first server transparency mechanism that said database system was committed; and
   providing a reply to the communications infrastructure from said first server transparency mechanism to said request from the communications infrastructure.

2. The method of controlling a transaction processing system as claimed in claim 1 including the steps of:
   receiving an indication of an undesirable condition of said database system by said first server transparency mechanism, said database system capable of rolling back and restarting after an undesirable condition; and
   placing the first server application and said first server transparency mechanism in communication with the database system after it has rolled back and restarted.

3. The method of controlling a transaction processing system as claimed in claim 2 including the steps of:
   determining, after said rolling back and restarting of the database system, the presence of said unique identification in the database system by said first server transparency mechanism;
   providing the absence of said unique identification to the communications infrastructure; and
   providing a request from the communications infrastructure to said first server transparency mechanism in the absence of said unique identification that said transaction be processed by the first server application and the database system.

4. The method of controlling a transaction processing system as claimed in claim 2 including the steps of:
   determining, after said rolling back and restarting of the database system, the presence of said unique identification in the database system by said first server transparency mechanism;
   indicating the presence of said unique identification to the communications infrastructure; and
   providing an indication to the communications infrastructure from said first server transparency mechanism that said database system was committed when said unique identification is present in said database system whereby said transaction does not have to be processed again.

5. The method of controlling a transaction processing system as claimed in claim 1 including the steps of:
   providing a request from a client application to a client transparency mechanism for a transaction to be processed;
   providing said request from said client transparency mechanism through the communications infrastructure to said first server transparency mechanism;
   receiving a reply from said first server transparency mechanism through the communications infrastructure by said client transparency mechanism;
   providing said reply from said client transparency mechanism to the client application;
   providing a commit from the client transparency mechanism in response to said reply thereto to said first server transparency mechanism;
   providing said commit from said first server transparency mechanism through the communications infrastructure to the database system; and
   providing a committed indication from said first server transparency mechanism to said client transparency mechanism; and
   providing said reply from said client transparency mechanism to the client application in response to said committed from said first server transparency mechanism.

6. The method of controlling a transaction processing system as claimed in claim 5 including the steps of:
   responding to an undesirable condition of the first server application by said client transparency mechanism to identify a second server application having the same functionality as said first server application;
   providing a roll back instruction through the communications infrastructure to said second server transparency mechanism connected to the second server application;
   providing said roll back instruction from said second server transparency mechanism through the communications infrastructure to the database system;

sending a retry from said second server transparency mechanism through the communications infrastructure to said client transparency mechanism; and sending said request from said client transparency mechanism that the transaction be processed by said second server transparency mechanism, said second server application, and the database system.

7. The method of controlling a transaction processing system as claimed in claim 6 including the steps of:

registering the functionality of second and third server applications through respective second and third server transparency mechanisms with a load balancing service on startup;

selecting the second server application based on the second server application having the same functionality as the first server application and on the load of the second and third server applications through respective second and third server transparency mechanisms by said load balancing service in response to an undesirable condition of the first server application;

providing a rollback message from said client transparency mechanism through the communications infrastructure to said second server transparency mechanism;

providing said rollback message from said second server transparency mechanism through said communications infrastructure to said database system to roll back said database system to a predetermined transaction;

providing a retry message from said second server transparency mechanism through said communications infrastructure to the client transparency mechanism in response to said roll back of said database system; and providing said request again from said client transparency mechanism through said communications infrastructure to said second server transparency mechanism to process the transaction in the second server application and the database system.

8. The method of controlling a transaction processing system as claimed in claim 6 including the step of:

responding to an undesirable condition of said load balancing service by restarting said load balancing service.

9. A method of controlling a transaction processing system having a client application, first server application, and a database system, comprising the steps of:

sending a request from the client application through a client transparency mechanism to a first server transparency mechanism, said first server transparency mechanism connected to the first server application;

starting a transaction at the database system by said first server transparency mechanism;

sending said request from said first server transparency mechanism to the first server application;

processing the transaction in the first server application and the database system;

providing a reply from the first server application to said first transparency mechanism;

suspending the operation of the database system;

providing said reply from said first server transparency mechanism to said first server transparency mechanism;

providing a commit message from said client transparency mechanism to said first server transparency mechanism;

resuming operation of the database system;

inserting a unique identification from said first server transparency mechanism in the database system;

providing an end for the transaction between said database system and said first server transparency mechanism;

committing the transaction in said database system and providing an indication thereof to said first server transparency mechanism;

providing an indication from said first server transparency mechanism to said client transparency mechanism that the transaction was committed in the database system; and providing said reply from said client transparency mechanism to said client application.

10. The method of controlling a transaction processing system as claimed in claim 9 including the steps of:

receiving an indication of an undesirable condition of the database system by said first server transparency mechanism, said database system capable of rolling back and restarting after an undesirable condition and providing an indication thereof;

responding to said indication of the database system rolling back and restarting by said server transparency mechanism to provide a retry message to said client transparency mechanism;

providing said request from said client transparency mechanism to said first server transparency mechanism to process the transaction; and completing the transaction.

11. The method of controlling a transaction processing system as claimed in claim 9 including the steps of:

determining, after said rolling back and restarting of the database system, the presence of said unique identification in the database system by said first server transparency mechanism;

responding to the absence of said unique identification by said first server transparency mechanism to have said client transparency mechanism retry said request; and providing said request by said client transparency mechanism in response to said retry.

12. The method of controlling a transaction processing system as claimed in claim 11 including the step of:

placing an universal unique identification in the database system when a transaction has been committed whereby a completed transaction can be subsequently identified.

13. The method of controlling a transaction processing system as claimed in claim 9 including the steps of:

responding to an undesirable condition of the first server application, after inserting said unique identification in the database system, by said client transparency mechanism to identify a second server application having the same functionality as said first server application and having a second server transparency mechanism connected thereto;

providing a check message from said client transparency mechanism to said second server transparency mechanism to provide a lookup said unique identification message to said database system; and providing a commit message from said second server transparency mechanism to said client transparency mechanism in response to the absence of said unique identification in the database;

providing a committed message from said second server transparency mechanism to said client transparency mechanism in response to said commit message; and providing said reply from said client transparency mechanism to the client application.

14. The method of controlling a transaction processing system as claimed in claim 9 including the steps of:

responding to an undesirable condition of the first server application, before inserting said unique identification, by said client transparency mechanism to identify a second server application having the same functionality as said first server application;

providing a roll back instruction to the second server application and said second server transparency mechanism from said client transparency mechanism;

providing said roll back instruction to the database system from the second server application whereby the database system rolls back to the last committed transaction;

sending a retry from said second server transparency mechanism to said client transparency mechanism after the database system has been rolled back; and sending a second request from the client transparency mechanism that the transaction be processed by said second server transparency mechanism and second server application.

15. The method of controlling a transaction processing system as claimed in claim 9 including the steps of:

registering the functionality of second and third server applications through respective second and third server transparency mechanisms with a load balancing service on startup and load changes;

selecting the second server application and said second server transparency mechanism based on the second server application and said second server transparency mechanism having the same functionality as the first server application and said first server transparency mechanism and on the load of the second server application being heavier than the third server application through respective second and third server transparency mechanisms by said load balancing service in response to an undesirable condition of the first server application and first server transparency mechanism;

providing a roll back instruction to said second server transparency mechanism from said client transparency mechanism;

rolling back said database system in response to said roll back instruction from said second server transparency mechanism whereby the database system rolls back to a predetermined condition;

sending a retry instruction from said second server transparency mechanism to said client transparency mechanism after the database system has been rolled back; and sending said request from the client transparency mechanism that said transaction be processed by the second server application and the database.

16. The method of controlling a transaction processing system as claimed in claim 15 including the step of:

responding to an undesirable condition of said load balancing service by restarting said load balancing service; and placing said client transparency mechanism back in communication with said load balancing service after restarting.

17. A transaction processing system comprising:

a client application for providing a transactional request and receiving a transactional reply;

a client transparency mechanism connectable to said client application for transmitting messages to and from said client application, and for providing messages related to failures in the transaction processing system;

a first server transparency mechanism connectable to said client transparency mechanism for transmitting messages to and from said client transparency mechanism;

a first server application connectable to said first server transparency mechanism for processing said transactional request;

a database system connectable to said first server application for processing transactions therefrom, said database system providing failure indications on failure thereof and including a roll back and restarting mechanism;

said client transparency mechanism including a mechanism responsive to and for providing instructions related to failures in said first server application, said first server transparency mechanism, and said database system, and providing failure recovery capability independent of said client application;

said first server transparency mechanism including a mechanism responsive to and for providing instructions related to failures in said database system, said first server transparency mechanism providing unique identification for said transaction.

18. The transaction processing system as claimed in claim 17 wherein:

said database system includes a mechanism responsive to the failure thereof for restarting and rolling back said database system to the last committed transaction; and said first server transparency mechanism includes a mechanism responsive to said restarting and rolling back of said database system for causing said first client transparency mechanism to retry said transaction when the unique identification of said last committed transaction fails to match said unique identification of said transaction.

19. The transaction processing system as claimed in claim 17 including:

a second server application for processing transactions and having substantially the same functionality as said first server application;

a third server application for processing transactions and having substantially the same functionality as said first server application;

an load balancing service for tracking the functionality of said first, second, and third server applications and the transaction processing loads respectively thereon;

said client transparency mechanism responsive to a failure indication of said first server application to obtain an alternate server application to communicate with from said load balancing service based on the closest functionality to said failed first server application and the transaction processing loads on said server applications.

20. The transaction processing system as claimed in claim 17 wherein:

said client transparency mechanism messages said client application only to provide a transactional reply.

* * * * *